Figure 1:
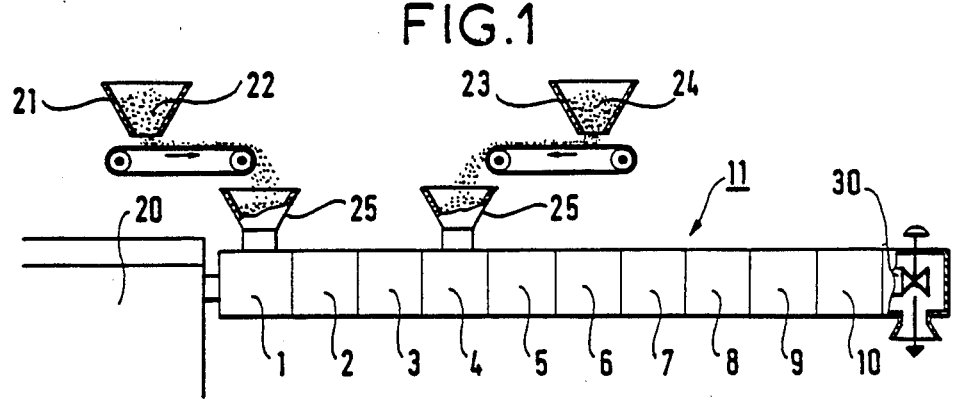

United States Patent [19]

Delphin et al.

[11] Patent Number: 4,717,505

[45] Date of Patent: Jan. 5, 1988

[54] ELECTRICALLY CONDUCTIVE THERMOPLASTIC MATERIAL

[75] Inventors: René Delphin, Fontenay Aux Roses; Bernard Regnaut, Antony, both of France

[73] Assignee: Occidental Chemical Corporation, Norwalk, Conn.

[21] Appl. No.: 810,121

[22] Filed: Dec. 18, 1985

[30] Foreign Application Priority Data

Dec. 18, 1984 [FR] France .................................. 84 19359

[51] Int. Cl.$^4$ .............................................. H01B 1/06
[52] U.S. Cl. ........................................ 252/511; 429/42
[58] Field of Search .................... 252/502, 511, 182.1; 524/495, 496; 429/210, 40, 42

[56] References Cited

U.S. PATENT DOCUMENTS

| | | | |
|---|---|---|---|
| 4,124,747 | 11/1978 | Murer et al. | 252/511 |
| 4,447,505 | 5/1984 | Blanchart | 429/42 |
| 4,461,814 | 7/1984 | Klinedunst | 429/42 |
| 4,536,272 | 8/1985 | Blanchart | 429/42 |
| 4,551,220 | 11/1985 | Oda et al. | 429/42 |
| 4,551,267 | 11/1985 | Fushimi et al. | 252/511 |
| 4,585,711 | 4/1986 | Vaidynathan | 429/42 |
| 4,587,039 | 5/1986 | Yamaoka et al. | 252/511 |

Primary Examiner—Josephine L. Barr
Attorney, Agent, or Firm—Sughrue, Mion, Zinn, Macpeak & Seas

[57] ABSTRACT

The invention relates to a conductive plastic material based on a thermoplastic resin and a carbon fill including both particles and fibers. The particles fill constitutes 30% to 50% by weight of the material, and the fiber fill constitutes not more than 10% by weight.

4 Claims, 2 Drawing Figures

ELECTRICALLY CONDUCTIVE THERMOPLASTIC MATERIAL

The present invention relates to a highly electrically conductive thermoplastic material usable, for example, in conductive seals, in bipolar elements of fuel cells, in other electrochemical devices, etc.

Such a material must present several characteristics simultaneously:

electrical resistivity which is as low as possible and in the range a few ohm-centimeters to a few tenths of an ohm-centimeter, for example;

good uniformity of composition and of electrical and mechanical characteristics in particular;

the absence of additives which are harmful to catalysts that may be used in the electrochemical devices concerned;

sufficient chemical inertness relative to the fluids flowing through such electrochemical devices at their operating temperatures;

very low cost price;

suitability for cheap industrial fabrication by the operations of: extrusion, calendering, hot pressing, injection, etc. for mass producing parts having the general shape of large surface area thin plates: thickness of about one millimeter; surface area of several tens of square decimeters up to one square meter;

mechanical characteristics such that the plates made in this way with this material are not fragile and have sufficient bending strength when hot and when cold to be compatible with the assembly methods used for electrochemical and other devices in which they may constitute component parts;

adequate sealing properties at the above-mentioned thicknesses relative both to gases and to liquids; and long-term stability of these characteristics compatible with the intended use.

It is possible to obtain a material which has suitable resistivity by incorporating a metal fill in a thermoplastic material. However, the cost of such a material is very high and in addition the metal fill cannot be chemically inert relative to the surrounding medium. It is thus more advantageous for these reasons to use carbon fills, which are much less expensive and which are generally less reactive.

Numerous electrically conductive thermoplastic materials containing carbon fills have already been made, and sometimes they have even been sold, as can be seen from the following articles:

Electrical Conduction Mechanism in carbon filled polymers (IEEE Transactions May/June 1971; pages 913 to 916);

Modern Plastics International: March 1976; pages 45 to 47;

JEE: November 1978; pages 42 to 45;

Modern Plastics International: August 1983; pages 38 to 40;

Research and Development: May 1984; pages 118 to 123;

Adhesive Age: June 1984; pages 17 to 20.

None of the materials described in these articles has all of the above-mentioned characteristics.

Table I below summarizes the electrical resistivity of currently known commercially available materials, together with a few details concerning their manufacture, their degree of carbon filling, and their melt flow index which determines whether they are suitable for cheaply manufacturing thin parts of large surface area.

TABLE I

| REFERENCE | METHOD Type of machine | RESISTIVITY ($\Omega$ cm) | CONCENTRATION (%) | MELT INDEX (g/10 mn) |
|---|---|---|---|---|
| DARLING Co. | Open mixer | 25.4 | 64 | |
| DARLING Co. | " | 7.6 | 70 | |
| DARLING Co. | " | 5.1 | 76 | |
| Esso Research | | 57 | 39 (1) | |
| Esso Research | | 17 | 32 (1) | |
| LNP | | 5 to 20 | 40 (2) | |
| UNIROYAL (TPR) | | 150 | | |
| CAPREZ | | 9.3 | 30 | 14.4 at 230° and 21.6 kg |
| CAPREZ CP | | 6 | | 4.5 at 230° and 21.6 kg |
| ABBEY 100 | | 8 | 45 | |
| DUPONT DE NEMOURS (NDX4769) | | 30 | | |
| TECKNIT 860 | | 10 | | |
| TECKNIT 861 | | 5 | | |
| CABELEC | | 0.7 | 50 | |
| CABELEC | | 0.9 | 47 | |

(1): Vulcan XC72 carbon black
(2): Carbon fibers

It can be see that the low electrical resistivity obtained by conventional methods (either using an open mixer or an internal, Banbury type mixer) are obtained at the price of a very high degree of carbon fill.

The materials obtained in this way are not usable for cheaply injecting thin parts of large surface area because they do not flow sufficiently when hot, or because the resulting objects are brittle.

U.S. Pat. No. 4,124,747 also describes a discontinuous method consisting in using a preheated Banbury type mixer to mix finely divided carbon into a propylene-ethylene thermoplastic copolymer, with there being about 30% carbon by weight. The preheat temperature is about 100° C.; mixing takes place for a duration of 3 to 5 minutes.

The thermoplastic material obtained in this way may be extruded in the form of sheets having a thickness in the range 150 microns to 500 microns and having a resistivity of a few ohm centimeters. However, it is practically impossible to use for obtaining thin parts of large surface area by injection because of the above-mentioned reasons.

Further, the applicant has performed a number of tests in order to improve this situation by using open or closed (Banbury type) mixers and also by prior mixing the two components in the powder state in an ultrafast mixer followed by plastification of the mixture in an extruding machine. The main results of these tests are summarized below in Table II.

TABLE II

| REFERENCE | METHOD Type of machine | RESISTIVITY ($\Omega$ cm) | CONCENTRATION (%) | MELT INDEX (g/10 min) |
|---|---|---|---|---|
| TEST No. 1 | Open mixer | 0.85 | 47 | |
| TEST No. 2 | Open mixer | 0.87 | 47 | |
| TEST No. 3 | Banbury | 0.43 | 47 | 0 to 230° and 21 kg |
| TEST No. 4 | Banbury | 0.80 | 47 | |
| TEST No. 5 | Banbury | 1 | 47 | 1 to 230° and 21.6 kg |

In conclusion, it appears that the various methods used up until now do not provide a material which is sufficiently electrically conductive without using concentrations of carbon which give rise to much too low a melt index to be able to inject thin parts of large surface area.

Preferred implementations of the present invention provide a conductive thermoplastic material whose resistivity is less than that of the earlier materials, i.e. is a few tenths of an ohm-centimeter, and whose fluidity when hot is sufficient for industrial application of the above-mentioned operations in order to obtain very thin conductive sheets which are not very fragile.

The present invention provides an electrically conductive thermoplastic material based on a mixture of thermoplastic resin and a carbon particle fill in the range 30% to 50% by weight, said material additionally including not more than 10% by weight of carbon fiber fill.

Surprisingly, a material is obtained having quite remarkable electrical characteristics, with its electrical conductivity being improved by a factor of several times.

Preferably the material in accordance with the invention is manufactured as follows:

a two-screw mixer is used, the screw length being more than twenty times the screw diameter, said thermoplastic resin being continuously inserted into a first zone of said two-screw mixer where it is compacted and preheated, said resin then passing into a second zone of said two-screw mixer where it is kneaded and plastified, a particulate carbon fill being continuously inserted into a third zone of said two-screw mixer, the fill constituting 30% to 50% by weight of the mixture and being dispersed in said third zone, the speed of rotation of said two-screw mixer lying in the range 165° C. to 300° C., and said mixture then being removed via the outlet from an extrusion head; a fill of carbon fibers is also inserted into said mixture either in conjunction with said fill of particles or at another moment, with the total quantity of carbon fiber fill not exceeding 10% by weight of the mixture.

Advantageously, the two-screw mixer includes a fourth zone downstream from said third zone and intended to degas said mixture at a pressure in the range atmospheric pressure and a few millibars.

Unexpectedly, performing the above method further improves the material in accordance with the invention quite considerably.

The thermoplastic resin may be a copolymer of ethylene and propylene, and the carbon fill may be selected from various types of carbon black. The carbon fill should be highly conductive and as cheap as possible while still being easy to incorporate in the resin. The lower the density of the fill, the easier it is to disperse, but the more difficult it turns out to incorporate in the resin. A compromise has to be achieved between a low fill ratio using finely divided carbon black and a higher fill ratio using a denser carbon black which is easier to incorporate.

The above-mentioned results are easily obtained if the continuous feeds of thermoplastic resin and carbon fill are therefore performed by means of weighing dispensers capable of ensuring that the raw material feed rates do not depart from their nominal settings by more than ±1%.

Figure 2:
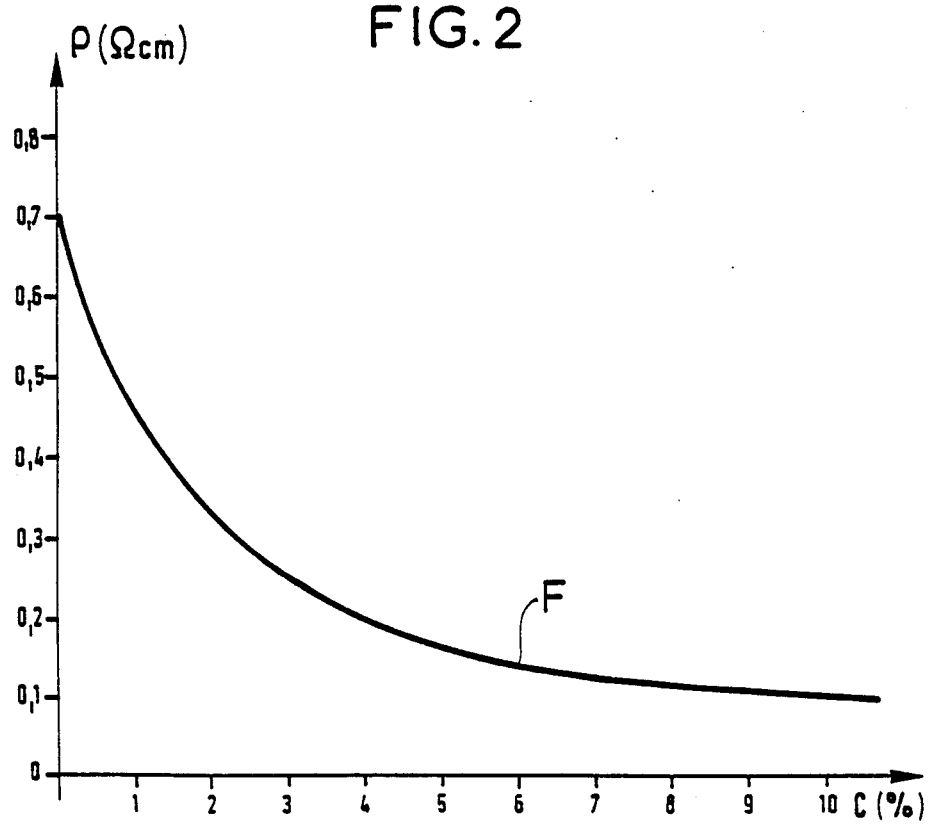

An implementation of the invention is described by way of example with reference to the accompanying drawing, in which:

FIG. 1 is a diagrammatic view of an apparatus for manufacturing material in accordance with the invention; and FIG. 2 is a graph showing the variation in resistivity $\rho$ ($\Omega$cm) as a function of concentration C (%) of carbon fiber fill in a material in accordance with the invention (curve F).

EXAMPLE I

A prior art material was made by inserting a copolymer of ethylene and propylene of the type sold under the name Propathene GY 702 M together with carbonyl black as sold under the name Vulcan XC 72 into an internal Banbury type mixer (see Table II). The concentration of black was 47%. The preheating temperature was 100° C. and the mixing temperature was 150° C. to 20° C. Mixing lasted for 5 to 10 minutes.

The resluting thermoplastic material had a resistivity of 0.54 ohm-cm.

A material in accordance with the invention was made under the same conditions, except that carbon fibers as sold under the name Morganite type II-S were added to the mixture.

When 3% fiber by weight of mixture were added, the resistivity fell from 0.54 ohm-cm to 0.2 ohm-cm. A similar drop from 0.54 ohm-cm to 0.2 ohm-cm was obtained by adding 6% fibers by weight of mixture. The addition of fibers thus provides considerably improved resistivity.

EXAMPLE II

A mixer 11 as shown in FIG. 1 was used to make a thermoplastic material from the same ingredients as in Example I, but having 38% particle fill.

The mixer is a two-screw type mixer as sold under the trademark Werner und Pfleidere, with a screw length which is more than twenty times the screw diameter. By way of example, the mixer may be a ZSK 30 or a ZSK 57 type mixer which respectively have diameters of 30 mm and 57 mm.

The two screws are encased in a series of ovens referenced 1 to 10 which are regulated, as is explained below, to temperatures in the range 165° C. to 300° C. The screws are driven by a motor which is diagrammatically represented by a box 20, and its speed of rotation lies in the range 150 rpm to 250 rpm.

A copolymer of propylene and ethylene 22 is accurately measured out to within ±1% by a weighing dispenser 21 and is introduced via a funnel 25 into a first zone of the two screws encased by the oven 1. At this stage the resin is compacted and preheated, but any gelification must be avoided. In succeeding ovens 2 and 3, the mixing and kneading continues and the resin is plastified, with the oven 20 being adjusted to 220° C. and the oven 3 to 295° C. The oven 4 is likewise adjusted to 295° C. and the carbon fill which is constituted by carbon black is introduced at this point. The fill is accurately measured by a weighing dispenser 23. Carbon black 24 is thus inserted into the resin and is dispersed therein.

Mixing and dispersal continue along the two screws through ovens 5 to 10, with the oven 5 being adjusted to 295° C. and ovens 6 to 10 being adjusted to 200° C. The mixture is degased at oven 9 which may be maintained at a pressure of 55 mBar, for example.

The resulting mixture passes through an extrusion head 30 which is adjusted to a temperature of about 250° C. Extrusion takes place through a die having ten holes each having a diameter of a few millimeters, with the material and the outlet from the die being at a temperature of about 270° C. The rods made in this manner are passed through a trough of water and are then inserted into a granulator.

Material may be obtained at a rate of about 55 kg per hour when the two screws are rotated at 250 revolutions per minute (rpm).

The resistivity of the material obtained is 0.70 ohm-cm. It should be pointed out that the carbon fill is much less in this case than it was in Example I.

In accordance with the invention, the above-described mixture which already contains 38% Vulcan XC 72 carbon black had various carbon fiber fills added thereto at rates of 3% to 9% by weight. It was observed in a surprising manner that the electrical conductivity was multiplied thereby by a factor of 3 to 6. With reference to FIG. 4, it can be seen that adding C' % fibers in the range 3%, 6% and 9%, the resistivity $\rho'$ dropped from 0.25, to 0.14 and to 0.12 ohm-centimeters.

It may be observed that the use of carbon fibers on their own give rise to high resistivity even at much higher concentrations than those used so far. For example, a mixture of 60% nylon 6/6 and 40% carbon fibers as manufactured by L.N.P. has a resistivity of 5 to 20 ohm-centimeters.

Using a conductive mixture with a 6% fill of short carbon fibers in accordance with the invention, the Applicant has made bipolar conductive elements for fuel cells which have much improved conductivity, and which also have the following characteristics:

hardness: 60 to 70 on the Shore scale;

flexibility: an element having the thickness of 1.5 mm may be bent without damage into a circular arc having a diameter of 150 mm;

tensile strength: the same element may be subjected to an ultimate tensile stress of 0.5 da N/mm$^2$ to 3.5 da N/mm$^2$ for an elongation of 4% to 7.5%; and the material is thermally and chemically inert.

Naturally, the invention is not limited to the implementation which has been described, in particular concerning the type of two-screw mixer, the temperatures to which the various ovens are adjusted, or the nature of the thermoplastic resin or of the carbon fill.

In particular, Vulcan carbon black may be replaced by other particulate carbon fills. Thus, Ketjen black sold under the trademark Akzo can be used to achieve the same resistivity as with Vulcan, but with a concentration of 25% instead of 38%.

We claim:

1. An electrically conductive thermoplastic material comprising a mixture of a propylene and ethylene copolymer, of carbon black in a proportion of 30% to 50% by weight, and of a fibrous carbon fill in a proportion of 3% to 10% by weight, wherein said material has an electrical resistivity of less than 0.5 $\Omega$cm.

2. The thermoplastic material in accordance with claim 1, wherein, said material has an electrical resistivity of less than 0.2 $\Omega$cm.

3. The thermoplastic material in accordance with claim 1, wherein said carbon black is in a proportion of between 35% and 45%.

4. The thermoplastic material in accordance with claim 3, wherein said carbon black is in a proportion of between 35% and 45%.

* * * * *